United States Patent
Hemmett et al.

(10) Patent No.: US 10,747,925 B1
(45) Date of Patent: Aug. 18, 2020

(54) VARIABLE ACCURACY INCREMENTAL TIMING ANALYSIS

(71) Applicant: International Business Machines Corporation, Armonk, NY (US)

(72) Inventors: Jeffrey Hemmett, St. George, VT (US); Kerim Kalafala, Rhinebeck, NY (US); Natesan Venkateswaran, Hopewell Junction, NY (US); Debjit Sinha, Wappingers Falls, NY (US); Eric Foreman, Fairfax, VT (US); Chaitanya Ravindra Peddawad, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/257,386

(22) Filed: Jan. 25, 2019

(51) Int. Cl.
| | |
|---|---|
| *G06F 9/455* | (2018.01) |
| *G06F 17/50* | (2006.01) |
| *G06F 30/3312* | (2020.01) |
| *G06F 30/327* | (2020.01) |
| *G06F 119/12* | (2020.01) |

(52) U.S. Cl.
CPC ........ *G06F 30/3312* (2020.01); *G06F 30/327* (2020.01); *G06F 2119/12* (2020.01)

(58) Field of Classification Search
USPC .................. 716/104, 106, 108, 111, 113
See application file for complete search history.

(56) References Cited

U.S. PATENT DOCUMENTS

| | | |
|---|---|---|
| 6,557,151 B1 | 4/2003 | Donath et al. |
| 8,046,725 B2 | 10/2011 | Kim et al. |
| 8,065,646 B2 | 11/2011 | Priel et al. |
| 8,141,025 B2 | 3/2012 | Sinha et al. |
| 8,307,317 B2 | 11/2012 | Adams et al. |
| 8,775,988 B2 | 7/2014 | Lavin et al. |

(Continued)

FOREIGN PATENT DOCUMENTS

WO 2012082498 A3 6/2012

OTHER PUBLICATIONS

Veetil et al., "Fast Statistical Static Timing Analysis Using Smart Monte Carlo Techniques", IEEE Transactions on Computer-Aided Design of Integrated Circuits and Systems, vol. 30, No. 6, Jun. 2011, pp. 852-865.

*Primary Examiner* — Brian Ngo
(74) *Attorney, Agent, or Firm* — Cantor Colburn LLP; Erik Johnson (57) ABSTRACT

A system and method of performing variable accuracy incremental timing analysis in integrated circuit development includes generating a timing graph for interconnected components. The timing graph represents each pin as a node and each interconnection as an arc. A first node or arc is selected. First-level timing values are obtained for the first node or arc using a first timing model that provides a first level of accuracy. n timing models with corresponding n levels of accuracy are pre-selected. The first-level timing values are copied as second-level timing values and as timing values for every other one of the n levels of accuracy for the first node or arc. A second node or arc downstream from the first node or arc is selected. Second-level timing values for the second node or arc are obtained using a second timing model that provides a second level of accuracy.

20 Claims, 5 Drawing Sheets

(56) References Cited

U.S. PATENT DOCUMENTS

| | | | |
|---|---|---|---|
| 8,977,995 B1 * | 3/2015 | Arora | G06F 30/327 |
| | | | 716/105 |
| 9,519,747 B1 | 12/2016 | Buck et al. | |
| 9,881,123 B1 | 1/2018 | Goyal et al. | |
| 2003/0121013 A1 * | 6/2003 | Moon | G06F 30/3312 |
| | | | 716/134 |
| 2004/0111247 A1 * | 6/2004 | Berevoescu | G06F 30/3312 |
| | | | 703/19 |

* cited by examiner

VARIABLE ACCURACY INCREMENTAL TIMING ANALYSIS

BACKGROUND

The present invention relates to integrated circuit generation, and more specifically, to variable accuracy incremental timing analysis.

The generation of an integrated circuit (i.e., chip) involves a number of phases including the high-level logic design, logic synthesis, physical synthesis, routing, and manufacturing phases. Each of the phases can include multiple processes that can be performed iteratively. An electronic design automation (EDA) tool can be used to perform many of the processes such as processes that are part of the logic synthesis and physical synthesis phases. The logic design can provide a register transfer level (RTL) description. The physical synthesis phase includes identifying and placing components, such as gate logic, to implement the logic design. A netlist can be produced to indicate the interconnections among components. In the routing phase, the placement of wires that connect gates and other components in the netlist is defined, and in the manufacturing phase, the finalized design is provided for physical implementation of the chip. In addition to functional requirements, an integrated circuit must typically also meet timing and power constraints. To ensure that timing requirements are met, timing analysis can be performed at different phases and iteratively.

SUMMARY

Embodiments of the present invention are directed to systems and methods of performing variable accuracy incremental timing analysis in integrated circuit development. The method includes generating a timing graph for interconnected components. The interconnected components are some or all components of an integrated circuit design, and the timing graph represents each pin as a node and each interconnection as an arc. The method also includes selecting a first node or arc of interest, and obtaining first-level timing values for the first node or arc by performing timing analysis using a first timing model. The first timing model provides a corresponding first level of accuracy and n timing models with corresponding n levels of accuracy are preselected. The first-level timing values for the first node or arc are copied as second-level timing values for the first node or arc and as timing values for every other one of the n levels of accuracy above the first level of accuracy. A second node or arc of interest that is downstream from the first node or arc of interest is selected in the timing graph, and second-level timing values for the second node or arc are obtained by performing the timing analysis using a second timing model. The second timing model provides a corresponding second level of accuracy that is higher than the first level of accuracy and the performing the timing analysis at the second node or arc using the second timing model includes using the second-level timing values for the first node or arc. The integrated circuit design that is finalized using the timing analysis on the timing graph is provided for implementation into an integrated circuit.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, timing analysis is an integral part of integrated circuit development and is used to ensure that the final design that is ultimately fabricated will conform with timing constraints as well as to functional and power requirements. Timing analysis generally examines the amount of time (i.e., delay) for a data signal or clock signal to propagate from pin to pin in the integrated circuit. The rise time of a signal (e.g., the time for voltage to increase from 10 percent (%) to 90% of the maximum value) or fall time of a signal (e.g., the time for voltage to fall from 90% to 10% of the maximum value) are referred to as the slew number. Delay and slew are two common metrics that are considered during timing analysis. The slack at a given pin, which is the difference between the arrival time (AT) and the required arrival time (RAT) of the data signal at the given pin, is another metric that can be of interest.

Different levels of accuracy in the determination of metrics of interest during timing analysis can be achieved in different ways. For example, static timing analysis (STA) is a deterministic process in which a single arrival time value is propagated through a set of pins based on a delay value associated with each arc between adjacent pins that can be obtained from a library. Statistical static timing analysis (SSTA) involves the consideration of delay through each arc statistically, as a probability distribution. A canonical delay model can be used to represent a distribution relative to the sources of variation that are considered. Generally, timing analysis is performed for each corner of interest (i.e., the particular combination of values for the sources of variation). A single corner can be a single set of values for process variation-supply voltage variation-operating temperature variation (PVT), for example. The delay canonical at a given pin of the integrated circuit is given by vector $x=[x_0\ x_1\ \ldots\ x_n]$, where $x_0$ is a mean value, $x_1$ is a sensitivity value for one source of variation, and $x_n$ is a sensitivity value for the nth source of variation. For a particular corner of interest, the delay can be expressed by the following:

$$\text{delay} = \begin{bmatrix} x_0 \\ x_1 \\ \vdots \\ x_n \end{bmatrix} \begin{bmatrix} \Delta X_1 \\ \vdots \\ \Delta X_n \end{bmatrix} \quad [\text{EQ. 1}]$$

In EQ. 1, each of the sensitivity values ($x_0$ to $x_n$) can be multiplied by an amount of deviation from the nominal ($\Delta X$) defining the corner. For example, $x_1$ can be temperature and $\Delta X_1$ can be 3, representing the 3 sigma value of the Gaussian distribution of temperature variation. Using EQ. 1, the delay for the corner of interest can be expressed as:

$$\text{delay} = x_0 + x_1 \Delta X_1 + x_2 \Delta X_2 + \ldots + x_n \Delta X_n \qquad [\text{EQ. 2}]$$

The timing metrics obtained with STA are less accurate than those obtained with SSTA. However, generally, performing timing analysis at a higher level of accuracy comes at the cost of runtime and resources. While this cost is necessary and worthwhile in some situations, it can be avoided in others. Embodiments of the systems and methods detailed herein relate to variable accuracy incremental timing analysis to facilitate a balance between increased accuracy when needed and decreased resource usage when lower accuracy timing analysis is sufficient. Incremental timing analysis refers to the fact that a design change in a portion of the integrated circuit design requires timing analysis to be repeated for that portion. In addition, timing analysis can be required downstream, at other portions of the integrated circuit design whose timing is affected by the updated timing of the redesigned portion.

Figure 1:
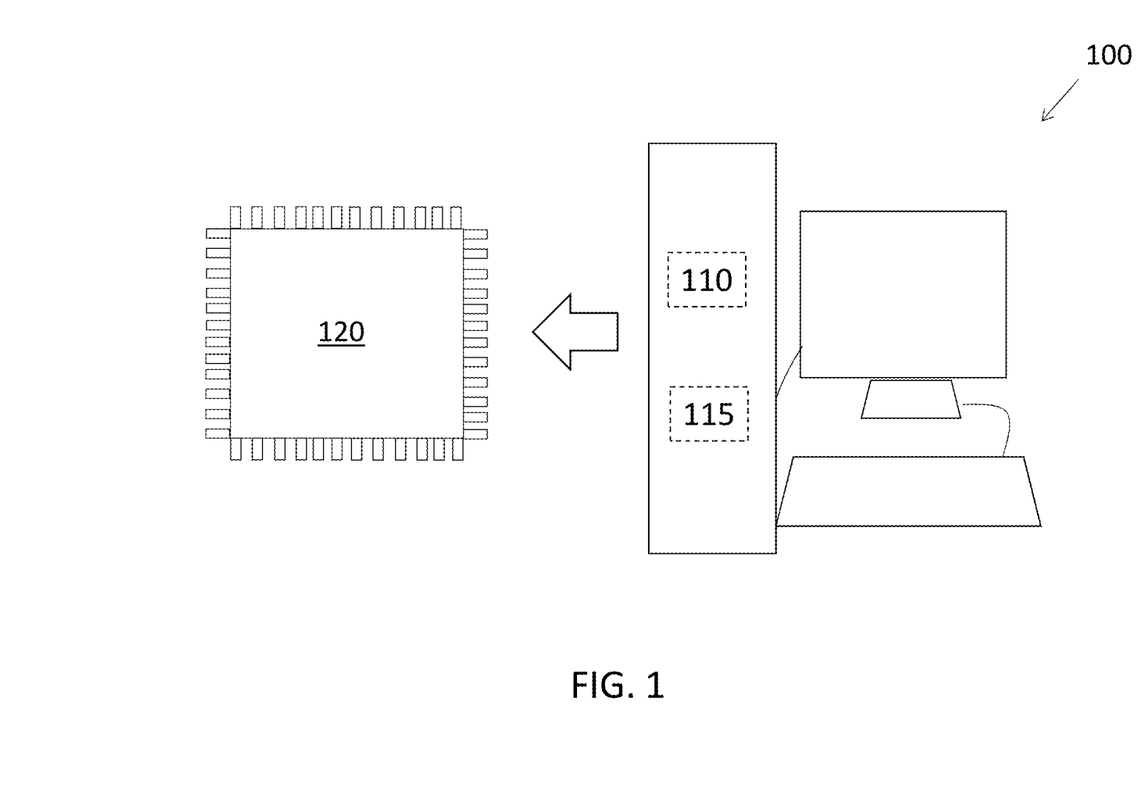
FIG. 1 is a block diagram of a system to perform variable accuracy incremental STA in integrated circuit development according to one or more embodiments of the invention.

FIG. 1 is a block diagram of a system 100 to perform variable accuracy incremental STA in integrated circuit development according to one or more embodiments of the invention. The system 100 includes processing circuitry 110 and memory 115 that is used to generate the design that is ultimately fabricated into an integrated circuit 120. The memory 115 also stores the intermediate values generated and used during timing analysis. The steps involved in the fabrication of the integrated circuit 120 are briefly described herein and with reference to FIG. 5. The physical layout is finalized, in part, based on the boundary assertion-based power recovery according to embodiments of the invention. The finalized physical layout is provided to a foundry. Masks are generated for each layer of the integrated circuit 120 based on the finalized physical layout. Then, the wafer is processed in the sequence of the mask order. The processing includes photolithography and etch. The fabrication is further discussed with reference to FIG. 5.

Figure 2:
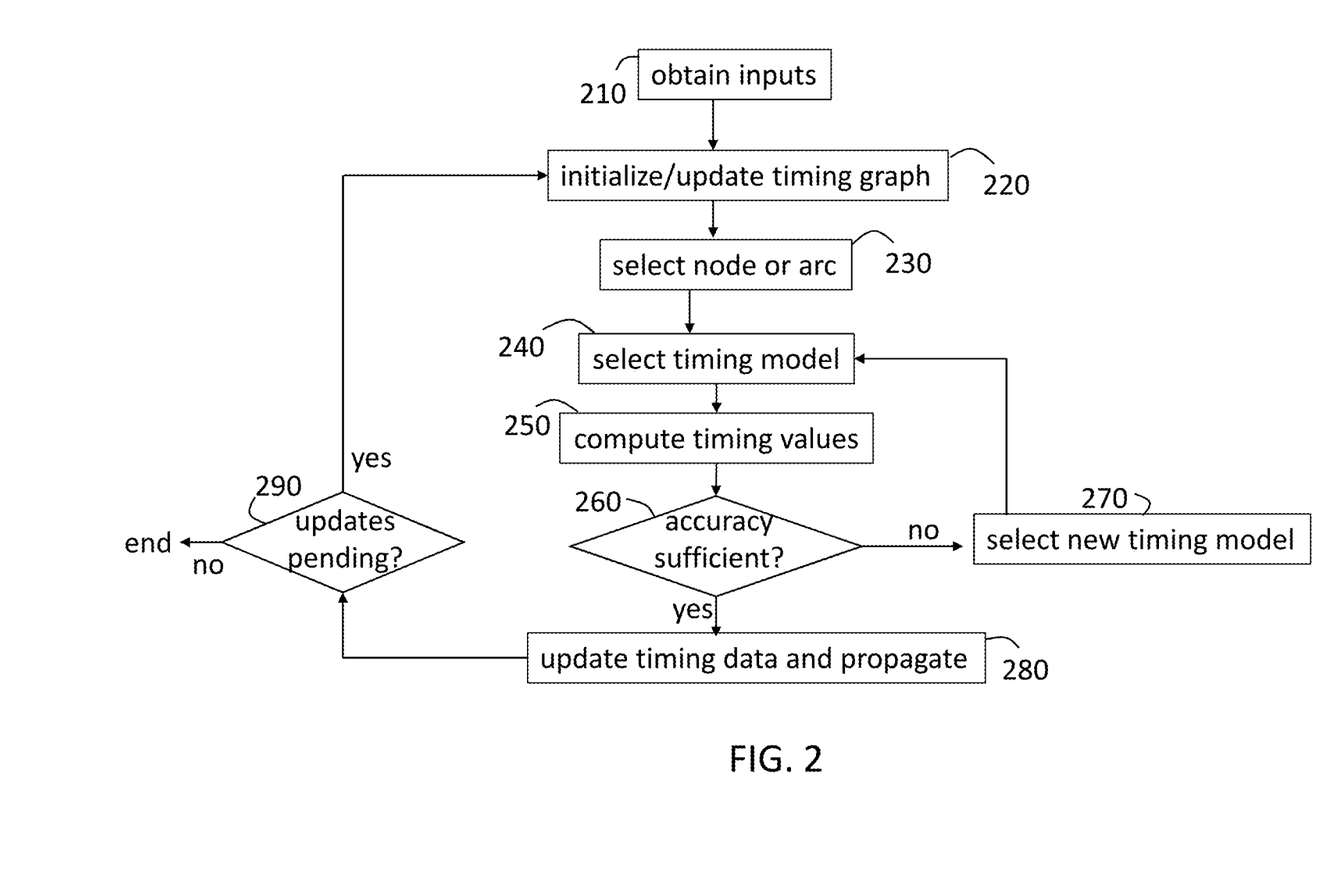
FIG. 2 is a process flow of methods of performing variable accuracy incremental timing analysis according to one or more embodiments of the invention.

FIG. 2 is a process flow of methods of performing variable accuracy incremental timing analysis according to one or more embodiments of the invention. At block 210, obtaining inputs includes obtaining input design data, which defines the components (e.g., logic gates, buffers, latches) of the integrated circuit design, the netlist, which defines the interconnections among components, and rules, which can include tables of delay data for each type of component. This information may be stored in memory 115. At block 220, initializing or updating the timing graph 300 (FIG. 3) refers to defining or updating (e.g., based on a design change) the representation of the components and the netlist that is used to perform timing analysis. The timing graph 300 is further discussed with reference to FIG. 3. Generally, every pin is represented as a node 310, pin-to-pin connections are represented as arcs 320, and timing metrics can be obtained for every arc 320 and every node 310 of the timing graph 300.

Selecting a node 310 or arc 320, at block 230, refers to a query for timing metrics for a specific node 310 or arc 320 or a specific set of nodes 310 or arcs 320. The query can be triggered automatically based on a redesign affecting certain nodes 310 or arcs 320 or can be generated by a chip designer, for example. Selecting a timing model, at block 240, involves selecting an accuracy level. The default initial selection of the timing model can be one at the lowest level of accuracy (e.g., STA). Based on some a priori knowledge related to the query, the chip development phase during which the timing analysis is being performed, the particular nodes 310 or arcs 320 involved, or some other factor, the initial timing model that is selected can have a particular accuracy level different than the default. At block 250, computing timing values include computing AT, slew, slack, and other metrics that can then be used for timing tests or otherwise analyzing the timing results of the selected nodes 310 or arcs 320.

At block 260, a check is done of whether the accuracy of the timing model, selected at block 240, was sufficient. The sufficiency can be judged based on several different criteria, as further discussed with reference to FIG. 4. If the accuracy of the timing model selected at block 240 is deemed to be insufficient, then selecting a new timing model, at block 270, refers to selecting one that has a higher level of accuracy in the timing value results. When more than two timing models are available for selection, the timing model with the next higher level of accuracy can be selected, at block 270, as a default. If the timing values obtained at block 250 provide some basis to select a timing model with an even higher level of accuracy, the default selection can be overridden, at block 270. As FIG. 2 indicates, the processes of computing timing values (at block 250), determining the sufficiency of the accuracy of the timing model used to obtain the timing values (at block 260), and selecting a new (higher accuracy) timing model (at block 270) are iterative.

If the check at block 260 indicates that the timing values computed at block 250 were obtained with sufficient accuracy, then timing data for the timing graph is updated and propagated, at block 280. To be clear, timing values are propagated for every accuracy level. That is, a number of accuracy levels (n) is pre-selected, and timing values for all n accuracy levels are populated at every node 310 and arc 320. Thus, when timing values obtained with a given timing model (with an accuracy level less than n) are deemed sufficient, at block 260, then those timing values are copied for every accuracy level up to the nth accuracy level for the current node 310 or arc 320. This copying can take the form of a pointer or reference to the timing values of the given timing model.

At block 290, a check is performed of whether all updates to the timing graph (at block 220) that are warranted by propagation of the timing data (at block 280) are completed. This check can be independent for each accuracy level based on independent propagation of timing values at each accuracy level. That is, n queues can be used to propagate the n accuracy levels independently. Each queue represents a wavefront of calculation at a given accuracy level. Thus, for example, the lowest accuracy timing values can be propagated and a check performed (e.g., whether timing slack is within a margin of error). The higher accuracy timing values can then optionally be propagated when the lowest accuracy timing values pass the check. If additional updates are pending, according to the check at block 290, then the process of updating the timing graph, at block 220, is performed for another iteration. The processes at blocks 280 and 290 relate to the incremental nature of the timing analysis.

Figure 3:
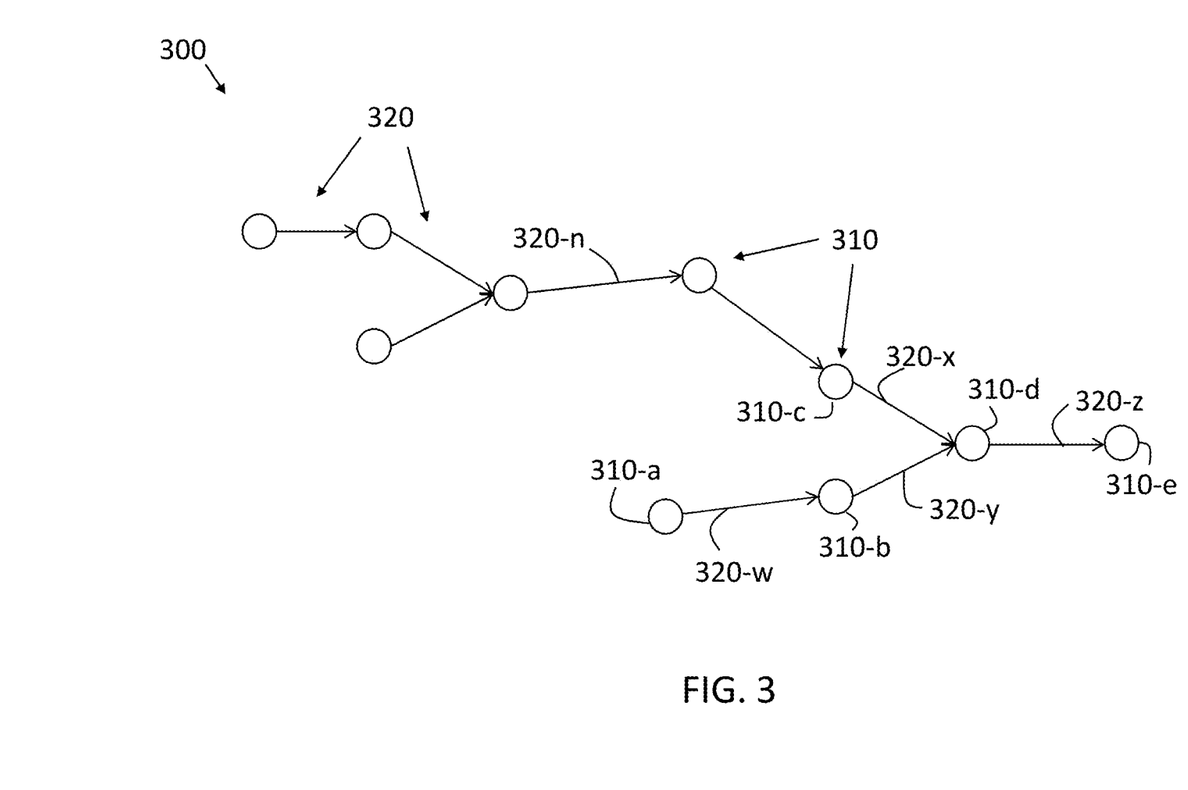
FIG. 3 shows an exemplary timing graph used to perform variable accuracy incremental timing analysis according to one or more embodiments of the invention.

FIG. 3 shows an exemplary timing graph 300 used to perform variable accuracy incremental timing analysis according to one or more embodiments of the invention. The integrated circuit design can be subdivided into different hierarchical levels (e.g., cores that include units that each include macros). The variable accuracy timing analysis described according to one or more embodiments of the invention can be performed at any hierarchical level or for the full integrated circuit. Each node 310 represents a pin (e.g., input or output pin of a NOT-AND (NAND) gate, input or output pin of a latch) and each arc 320 represents a path associated with a delay. For example, the arc 320 can be from an input pin of a NAND gate to the output pin of the NAND gate and represent the delay within the NAND gate. As another example, the arc 320 can be between pins of different components (e.g., from an output pin of a buffer to an input pin of a NAND gate) and represent delay through a wire connecting the two components. The arrows indicate the direction of travel of the signal and clarify that upstream components are those that supply signals to components that are downstream along a given path from pin-to-pin that is defined by the arcs 320.

Generally, at any level of accuracy, timing analysis involves the propagation of timing values from pin to pin. An exemplary set of nodes 310 (310-*a*, 310-*b*, 310-*c*, 310-*d*, 310-*e*) connected by an exemplary set of arcs 320 (320-*w*, 320-*x*, 320-*y*, 320-*z*) is indicated in FIG. 3 to discuss exemplary timing values based on selecting STA as the timing model (at block 240). The arrival time ATa of a data signal at node 310-*a* is propagated through arc 320-*w* to node 310-*b*. If the arrival time ATa of a data signal at node 310-*a* is assumed to be 0 for explanatory purposes, then the arrival time ATb at node 310-*b* is the sum of ATa (0), the delay Da associated with the node 310-*a*, and the delay Dw through arc 320-*w* (Da+Dw). The arrival time of a clock signal at node 310-*c* is assumed to be some value ATc. If the node 310-*c* is the clock signal input pin of a flip-flop and the node 310-*b* is the data signal input pin of the flip-flop, the timing analysis can be used to ensure that the data signal does not reach node 310-*b* before the clock signal reaches the node 310-*c*, resulting in the data not latching properly. Thus, a determination can be made of whether ATc is before ATb to ensure proper latching of the data. That is, a query regarding the flip-flop can result in the selection of the nodes 310 and arcs 320 associated with the flip-flop, at block 230.

While AT can be one metric of interest, as in the example, slew or slack can be of interest, as well. In addition, the timing graph 300 indicates the incremental aspect of timing analysis that involves the processes at blocks 280 and 290. For example, if a change is made that affects the timing values (e.g., slew or slack) for arc 320-*n*, then the timing values of downstream nodes 310 and arcs 320, such as nodes 310-*d* and 310-2 and arcs 320-*x* and 320-*z*, must be updated because those values propagate from arc 320-*n*.

As previously noted, timing values are saved for every one of the n pre-selected levels of accuracy at each node 310 and arc 320 during the timing analysis. When timing values are not calculated for one or more levels, because a lower accuracy timing model was deemed sufficient, then the timing values determined at the next closest accuracy level are stored. For example, if the timing model with the n−1 accuracy level is deemed sufficient (at block 260, FIG. 2) for node 310-*c*, then the timing values determined with that (n−1) timing model are also stored as the timing values for level n. At the next node 310-*d*, if it is determined that the timing analysis requires the timing model with the n accuracy level, then the timing values stored as the level n timing values for node 310-*c*, which are actually the timing values computed with the n−1 accuracy level timing model, are used.

Figure 4:
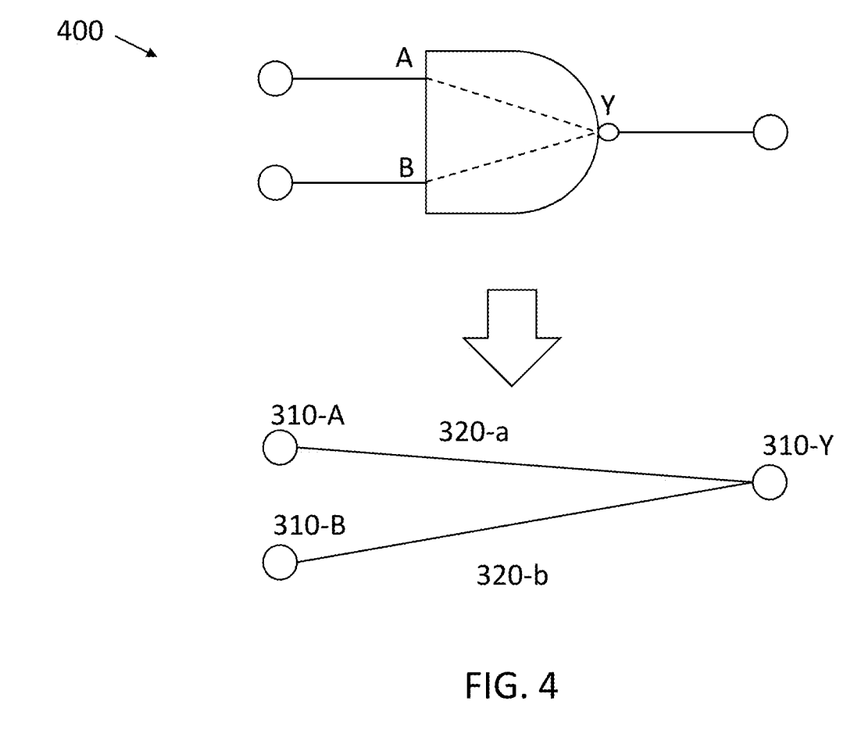
FIG. 4 is an exemplary NOT-AND (NAND) gate that can be analyzed using variable accuracy incremental timing analysis according to one or more embodiments of the invention.

FIG. 4 is an exemplary NAND gate 400 that can be analyzed using variable accuracy incremental timing analysis according to one or more embodiments of the invention. As FIG. 4 indicates, the NAND gate 400 includes two input nodes 310-A and 310-B that connect with the output node 310-Y through respective arcs 320-*a* and 320*b*. Thus, there are two AT at node 310-Y, one pertaining to the signal through arc 320-*a* and one pertaining to the signal through arc 320-*b*. The AT of the signal from node 310-A through arc 320-*a* is the AT of the signal at node 310-A added to the delay through arc 320-*a*. Similarly, the AT of the signal from node 310-B through arc 320-*b* is the AT of the signal at node 310-B added to the delay through arc 320-*b*. If the query driving the selection at block 230 pertains to the exemplary NAND gate 400, the maximum AT at the output node 310-Y (i.e., the later of the AT of the signal through arc 320-*a* and the AT of the signal through arc 320-*b*) is of interest, because both signals are needed to provide the output from node 310-Y. A metric that may be considered then is the slack of the maximum AT signal at node 320-Y. That is, the AT of the later of the signals coming through arcs 320-*a* and 320-*b* is compared with the RAT for node 310-Y.

In the exemplary case of the NAND gate 400, sufficiency (assessed at block 260, FIG. 2) of the timing model (selected at block 240) can be based on the maximum change in slack value that can result from using the next most accurate timing model. For example, the slack at node 310-Y, as determined by selecting an initial timing model (e.g., STA) at block 240, is nearly 0 for explanatory purposes. In this case, if, among the available timing models, the one with the next higher level of accuracy could change the slack value by 100 picoseconds, for example, then a further iteration using that timing model (at block 240) to ascertain if a slack computation remains at or above 0 can be deemed warranted, because there is a potential that the slack could actually be as low as −100 picoseconds. On the other hand, if slack at node 310-Y is determined to be +200 picoseconds using the initial timing model selected at block 240, then a higher accuracy timing model that has a potential to change the slack value by as much as 100 picoseconds is not warranted, because the worst-case slack that could be obtained with that higher accuracy timing model is still +100 picoseconds. Based on the metrics of interest for the nodes 310 and arcs 320 selected at block 230, a factor other than the largest possible change in slack value can be used to ascertain (at block 260) the sufficiency of the accuracy of the timing model selected at block 240. Exemplary alternate metrics include slew limits and some combination of slack and slew.

An important feature of the timing analysis according to one or more embodiments of the invention is that the final timing model selected, at block 240, for a given node 310 or arc 320 or set of nodes 310 or arcs 320 that are selected at block 230 does not affect the final timing model that is selected, at block 240, for a different node 310 or arc 320 or set of nodes 310 or arcs 320 that are selected at block 230. This gives rise to the variability in accuracy according to embodiments of the invention. That is, according to the processes shown in FIG. 2, a higher accuracy timing model (e.g., SSTA) can ultimately be selected to determine slack at node 310-*a* (FIG. 3) but a lower accuracy timing model (e.g., STA) can be deemed sufficient to determine the slack (or other metric) at node 310-*d*, which is downstream from node 310-*a*, for example.

As previously noted, timing values are stored and propagated at every one of the n pre-selected accuracy levels. As also noted, when timing values are not available for a given level, the timing values calculated at the closest level are copied. In the previously noted exemplary case of a lower accuracy timing model being needed at node 310-*d* than at node 310-*a*, the higher accuracy level timing values obtained at node 310-*a* are propagated (as are timing values at every level) but only the lower accuracy timing values are used at node 310-*d*. The timing values computed at node 310-*d* will then be copied for subsequently higher levels. This variable accuracy in timing analysis of different components of the integrated circuit design ensures that upstream timing analysis need not be re-addressed based on the level of accuracy for timing analysis required downstream.

Two previously noted examples of timing models that provide timing results with different levels of accuracy are STA and SSTA. In addition, other timing models can also provide timing values with different levels of accuracy. For example, an Elmore delay calculation provides a simple approximation of delay by modeling components of interest (selected at block 230) as a resistor-capacitor (RC) network. Delay values obtained using an Elmore model have relatively lower accuracy than those computed using, for example, a non-linear slew model. Other relatively higher accuracy timing models also include current source models (use of waveforms) vs. basic linear ramp library characterization analysis. Additional examples of timing models include a direct lookup table, a linear ramp library, and current source waveform modeling. While non-limiting examples have been provided, any known timing analysis models that use and provide timing values such as delay, AT, slew, and slack, for example, can be ranked in terms of the relative accuracy of their results and selected (at block 240) accordingly.

According to one or more embodiments of the invention and based on the processes shown in FIG. 2 and discussed previously, timing values can be obtained with different accuracy levels at different parts of the integrated circuit design. By facilitating increased accuracy where needed without the strain on resources and runtime in areas where increased accuracy is not needed, the variable accuracy incremental timing analysis according to one or more embodiments of the invention increases the efficiency of the integrated circuit development process that ultimately results in the manufacture of the integrated circuit 120.

Figure 5:
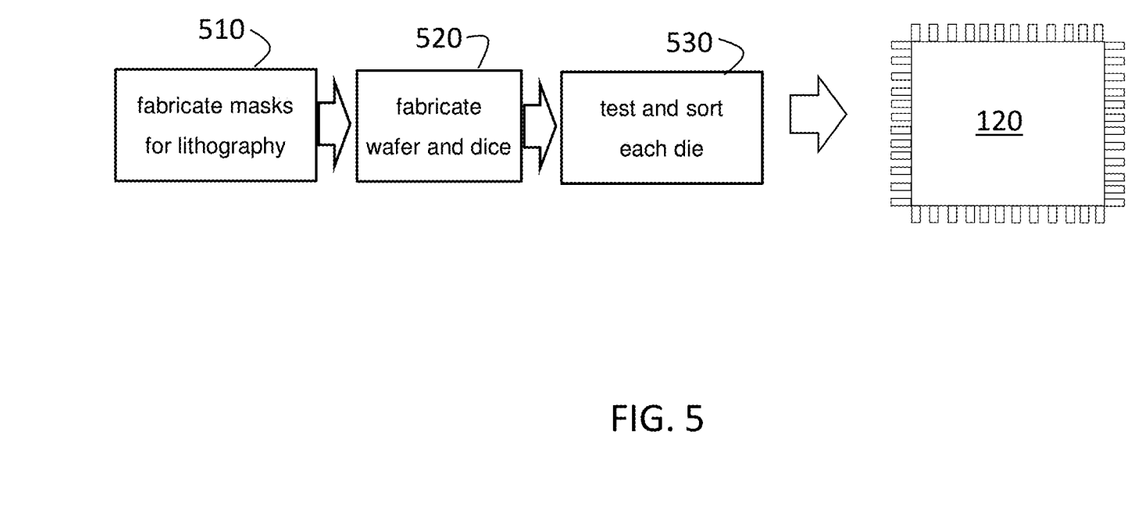
FIG. 5 is a process flow of a method of fabricating the integrated circuit designed according to one or more embodiments of the invention.

FIG. 5 is a process flow of a method of fabricating the integrated circuit 120 designed according to one or more embodiments of the invention. Once the physical synthesis phase and other phases are completed, based, in part, on the variable accuracy incremental timing analysis according to one or more embodiments of the invention, the processes shown in FIG. 5 can be performed to fabricate the integrated circuit 120. Generally, a wafer with multiple copies of the final design is fabricated and cut (i.e., diced) such that each die is one copy of the integrated circuit 120. At block 510, the processes include fabricating masks for lithography based on the finalized physical layout. At block 520, fabricating the wafer includes using the masks to perform photolithography and etching. Once the wafer is diced, testing and sorting each die is performed, at block 530, to filter out any faulty die.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing variable accuracy incremental timing analysis in integrated circuit development, the method comprising:
    generating, using a processor, a timing graph for interconnected components, wherein the interconnected components are some or all components of an integrated circuit design, and the timing graph represents each pin as a node and each interconnection as an arc;
    selecting a first node or arc of interest;
    obtaining, using the processor, first-level timing values for the first node or arc by performing timing analysis using a first timing model, wherein the first timing model provides a corresponding first level of accuracy and n timing models with corresponding n levels of accuracy are pre-selected;
    copying, using the processor, the first-level timing values for the first node or arc as second-level timing values for the first node or arc and as timing values for every other one of the n levels of accuracy above the first level of accuracy;
    selecting, using the processor, a second node or arc of interest that is downstream from the first node or arc of interest in the timing graph;
    obtaining, using the processor, second-level timing values for the second node or arc by performing the timing analysis using a second timing model, wherein the second timing model provides a corresponding second level of accuracy that is higher than the first level of accuracy and the performing the timing analysis at the second node or arc using the second timing model includes using the second-level timing values for the first node or arc; and providing the integrated circuit design that is finalized using the timing analysis on the timing graph for implementation into an integrated circuit.

2. The computer-implemented method according to claim 1, further comprising selecting an initial timing model that provides a corresponding initial level of accuracy; computing initial-level timing values for the first node or the arc of interest using the initial timing model; determining that the initial level of accuracy of the initial timing values must be increased; and selecting the first timing model to obtain the first-level timing values for the first node or arc, wherein the first level of accuracy is higher than the initial level of accuracy corresponding with the initial timing model.

3. The computer-implemented method according to claim 2, wherein the selecting the first timing model following selecting the initial timing model to obtain the timing values for the first node or arc is a result of an iterative process.

4. The computer-implemented method according to claim 1, further comprising performing a design change to the first node or arc, updating the timing graph and the timing values for the first node or arc based on the design change, and propagating the timing values for the first node or arc at every one of the n levels of accuracy to update the timing values for the second node or arc.

5. The computer-implemented method according to claim 1, further comprising performing a design change to the first node or arc, updating the timing graph and the timing values for the first node or arc based on the design change, using n separate queues to respectively propagate the timing values at the n levels of accuracy, and initially propagating only the timing values for the first node or arc at a lowest level of accuracy among the n levels of accuracy to determine if a timing check is passed.

6. The computer-implemented method according to claim 1, wherein the obtaining the timing values for the first node or arc and the obtaining the timing values for the second node or arc includes obtaining delay, slew, arrival time, or timing slack values.

7. The computer-implemented method according to claim 1, wherein the obtaining the timing values for the first node or arc by performing the timing analysis using the first timing model includes using static timing analysis, and the obtaining the timing values for the second node or arc by performing the timing analysis using the second timing model includes using statistical static timing analysis, or the obtaining the timing values for the first node or arc by performing the timing analysis using the first timing model includes using a non-linear slew model, and the obtaining the timing values for the second node or arc by performing the timing analysis using the second timing model includes using an Elmore delay calculation based on a resistor-capacitor (RC) model.

8. A system to perform variable accuracy incremental timing analysis in integrated circuit development, the system comprising:

a memory device configured to store a timing graph for interconnected components, wherein the interconnected components are some or all components of an integrated circuit design, and the timing graph represents each pin as a node and each interconnection as an arc; and a processor configured to select a first node or arc of interest, to obtain first-level timing values for the first node or arc by performing timing analysis using a first timing model, wherein the first timing model provides a corresponding first level of accuracy and n timing models with corresponding n levels of accuracy are pre-selected, to copy the first-level timing values for the first node or arc as second-level timing values for the first node or arc and as timing values for every other one of the n levels of accuracy above the first level of accuracy, to select a second node or arc of interest that is downstream from the first node or arc of interest in the timing graph, and to obtain second-level timing values for the second node or arc by performing the timing analysis using a second timing model, wherein the second timing model provides a corresponding second level of accuracy that is higher than the first level of accuracy and the performing the timing analysis as the second node or arc using the second timing model includes using the second-level timing values for the first node or arc, wherein the integrated circuit design that is finalized using the timing analysis on the timing graph is provided for implementation into an integrated circuit.

9. The system according to claim 8, wherein the processor is further configured to select an initial timing model that provides a corresponding initial level of accuracy; computing initial-level timing values for the first node or the arc of interest using the initial timing model, to determine that the initial level of accuracy of the initial timing values must be increased, and to select the first timing model to obtain the first-level timing values for the first node or arc, wherein the first level of accuracy is higher than the initial level of accuracy corresponding with the initial timing model.

10. The system according to claim 9, wherein the processor is configured to select the first timing model following selection of the initial timing model to obtain the timing values for the first node or arc in an iterative process.

11. The system according to claim 8, wherein the processor is further configured to perform a design change to the first node or arc, to update the timing graph and the timing values for the first node or arc based on the design change, and to propagate the timing values for the first node or arc at every one of the n levels of accuracy to update the timing values for the second node or arc.

12. The system according to claim 8 wherein the processor is further configured to perform a design change to the first node or arc, to update the timing graph and the timing values for the first node or arc based on the design change, use n separate queues to respectively propagate the timing values at the n levels of accuracy, and to initially propagate only the timing values for the first node or arc at a lowest level of accuracy among the n levels of accuracy to determine if a timing check is passed.

13. The system according to claim 8, wherein the timing values include delay, slew, arrival time, or timing slack values.

14. The system according to claim 8, wherein the first timing model uses static timing analysis, and the second timing model uses statistical static timing analysis, or the first timing model uses a non-linear slew model, and the second timing model uses an Elmore delay calculation based on a resistor-capacitor (RC) model.

15. A computer program product for performing variable accuracy incremental timing analysis in integrated circuit development, the computer program product comprising a computer readable storage medium having program instructions embodied therewith, the program instructions executable by a processor to perform a method comprising:

generating a timing graph for interconnected components, wherein the interconnected components are some or all components of an integrated circuit design, and the timing graph represents each pin as a node and each interconnection as an arc;

selecting a first node or arc of interest;

obtaining first-level timing values for the first node or arc by performing timing analysis using a first timing model, wherein the first timing model provides a corresponding first level of accuracy and n timing models with corresponding n levels of accuracy are pre-selected;

copying the first-level timing values for the first node or arc as second-level timing values for the first node or arc and as timing values for every other one of the n levels of accuracy above the first level of accuracy;

selecting a second node or arc of interest that is downstream from the first node or arc of interest in the timing graph; and obtaining second-level timing values for the second node or arc by performing the timing analysis using a second timing model, wherein the second timing model provides a corresponding second level of accuracy that is higher than the first level of accuracy and the performing the timing analysis at the second node or arc using the second timing model includes using the second-level timing values for the first node or arc, wherein the integrated circuit design that is finalized using the timing analysis on the timing graph is provided for implementation into an integrated circuit.

16. The computer program product according to claim 15, further comprising selecting an initial timing model that provides a corresponding initial level of accuracy; computing initial-level timing values for the first node or the arc of interest using the initial timing model; determining that the initial level of accuracy of the initial timing values must be increased; and selecting the first timing model to obtain the first-level timing values for the first node or arc, wherein the first level of accuracy is higher than the initial level of accuracy corresponding with the initial timing model.

17. The computer program product according to claim 16, wherein the selecting the first timing model following selecting the initial timing model to obtain the timing values for the first node or arc is a result of an iterative process.

18. The computer program product according to claim 15, further comprising performing a design change to the first node or arc, updating the timing graph and the timing values for the first node or arc based on the design change, and propagating the timing values for the first node or arc at every one of the n levels of accuracy to update the timing values for the second node or arc.

19. The computer program product according to claim 15, further comprising performing a design change to the first node or arc, updating the timing graph and the timing values for the first node or arc based on the design change, using n separate queues to respectively propagate the timing values at the n levels of accuracy, and initially propagating only the timing values for the first node or arc at a lowest level of accuracy among the n levels of accuracy to determine if a timing check is passed.

20. The computer program product according to claim 15, wherein the obtaining the timing values for the first node or arc and the obtaining the timing values for the second node or arc includes obtaining delay, slew, arrival time, or timing slack values, and the obtaining the timing values for the first node or arc by performing the timing analysis using the first timing model includes using static timing analysis, and the obtaining the timing values for the second node or arc by performing the timing analysis using the second timing model includes using statistical static timing analysis, or the obtaining the timing values for the first node or arc by performing the timing analysis using the first timing model includes using a non-linear slew model, and the obtaining the timing values for the second node or arc by performing the timing analysis using the second timing model includes using an Elmore delay calculation based on a resistor-capacitor (RC) model.

* * * * *